US011833949B2

(12) United States Patent
Paradis et al.

(10) Patent No.: US 11,833,949 B2
(45) Date of Patent: Dec. 5, 2023

(54) INTEGRATED ASSIST GRIP DEVICE

(71) Applicant: TOYOTA MOTOR ENGINEERING & MANUFACTURING NORTH AMERICA, INC., Plano, TX (US)

(72) Inventors: Alexander L. Paradis, Ann Arbor, MI (US); Frank A. Richards, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/576,789

(22) Filed: Jan. 14, 2022

(65) Prior Publication Data
US 2023/0226963 A1 Jul. 20, 2023

(51) Int. Cl.
*B60N 3/02* (2006.01)
*B62D 25/04* (2006.01)

(52) U.S. Cl.
CPC ............. *B60N 3/023* (2013.01); *B62D 25/04* (2013.01)

(58) Field of Classification Search
CPC .......... B62D 25/04; B60N 3/02; B60N 3/023; B60N 3/026
USPC ........................... 296/1.02; 16/405, 408, 429
See application file for complete search history.

(56) References Cited

U.S. PATENT DOCUMENTS

| 1,268,209 | A | * | 6/1918 | Brady | ................... | B61D 23/00 |
| | | | | | | 105/461 |
| 6,340,189 | B1 | * | 1/2002 | Pordy | ................... | B60N 3/026 |
| | | | | | | 16/110.1 |
| 8,544,937 | B2 | | 10/2013 | Orlowsky | | |
| 8,807,807 | B2 | | 8/2014 | Wheeler | | |
| 10,847,998 | B2 | | 11/2020 | Gerardiere | | |
| 2005/0133078 | A1 | * | 6/2005 | Fujitsubo | ............... | B60N 3/026 |
| | | | | | | 135/72 |
| 2017/0320420 | A1 | * | 11/2017 | Logan, Jr. | ............. | B60J 5/0493 |
| 2021/0277690 | A1 | | 9/2021 | Vollmer | | |
| 2022/0072987 | A1 | * | 3/2022 | Sakurai | ................. | B60N 3/023 |

FOREIGN PATENT DOCUMENTS

| CN | 208040098 U | | 11/2018 |
| EP | 3405633 B1 | | 2/2020 |
| JP | 2007126053 A | * | 5/2007 |
| JP | 2018144584 A | * | 9/2018 |

* cited by examiner

Primary Examiner — Dennis H Pedder
(74) Attorney, Agent, or Firm — SHEPPARD, MULLIN, RICHTER & HAMPTON LLP; Hector A. Agdeppa; Daniel N. Yannuzzi

(57) ABSTRACT

Systems are provided for integrating a deployable grip with a vehicle. The deployable grip may comprise a support coupled to a portion of a vehicle and a handle attached to the support and configured to move between a deployed position and a retracted position relative to the support upon application of a force on the handle. The handle provides a physical aid, when deployed, to an occupant of the vehicle while the occupant is entering or exiting the vehicle, is deployable when a door of the vehicle proximal to which the support is coupled to the portion of the vehicle is open, is not deployable when the door is closed.

12 Claims, 3 Drawing Sheets

INTEGRATED ASSIST GRIP DEVICE

TECHNICAL FIELD

The present disclosure relates generally to devices that assist an occupant of a vehicle to ingress and/or egress the vehicle, and in particular, some implementations may relate to devices that provide a grip location for the occupant to grip and use as a support during ingress and/or egress of the vehicle.

DESCRIPTION OF RELATED ART

Various occupants, such as passengers and/or operators, in vehicles have difficulty entering and exiting vehicles. This may be due to particularities of the vehicle, such as ride height, obstacles in an environment of the vehicle, mobility of the occupant, and so forth. In some embodiments, the occupant may utilize a removable handle or similar device that temporarily attaches to the vehicle and provides the occupant with the handle for use as, for example, a leverage point or hand hold when entering and/or exiting the vehicle. However, because such devices are removable, the occupant must manually store the device within reach but stowed safely so that the device does not become an impediment while operating the vehicle. Furthermore, because such devices are manually deployed, the occupant must hope that the device did not move during operation of the vehicle and that it is still accessible by the occupant. Additionally, because these devices often attach to a door frame of the vehicle (for example, to a pillar of the door frame, an anchor for a door latch, and so forth), use of the devices can cause damage to the vehicle or the devices. For example, failure to remove the device before closing a corresponding vehicle door, or even use of the device when improperly attached to the door frame, can result in damage to the door frame that can impede closing the vehicle door or other operation or function of the vehicle. Thus, improvements to such grip devices are beneficial.

BRIEF SUMMARY OF THE DISCLOSURE

In accordance with one embodiment, a deployable grip comprises a support coupled to a portion of a vehicle and a handle attached to the support and configured to move between a deployed position and a retracted position relative to the support upon application of a force on the handle. The handle provides a physical aid, when deployed, to an occupant of the vehicle while the occupant is entering or exiting the vehicle, is deployable when a door of the vehicle proximal to which the support is coupled to the portion of the vehicle is open, is not deployable when the door is closed.

In some embodiments, the portion of a vehicle comprises a pillar of the vehicle.

In some embodiments, the support is disposed inside of a reinforced cavity disposed in the pillar of the vehicle.

In some embodiments, the handle is further configured to extend and retract relative to the deployed position and wherein an extended position of the handle provides the occupant with improved access to the handle.

In some embodiments, at least one of the support or the handle comprises a sensor configured to generate a signal indicating whether the handle is in the deployed position or the retracted position.

In some embodiments, a controller is configured to generate an alert to the occupant based on the signal from the sensor that the handle is in the deployed position after the occupant uses the handle to enter or exit the vehicle.

In some embodiments, at least one of the support or the handle comprises a motor configured to cause the handle to deploy into the deployed position or retract into the retracted position and wherein a controller is configured to automatically cause the motor to deploy the handle when the door is opened and retract the handle after use by the occupant.

In some embodiments, the handle rotates around a vertical axis relative to the vehicle.

In accordance with another embodiment, a stowable assistive device comprises a reinforced cavity embedded within a door frame of a vehicle in proximity to an occupant point of entry and exit of the vehicle, a support disposed with the reinforced cavity, and a handle attached to the support and configured to move between a deployed position and a retracted position relative to the support upon application of a force on the handle. The handle provides a physical aid, when deployed, to the occupant of the vehicle while the occupant is entering or exiting the vehicle and stows in the reinforced cavity when not in the deployed position and when in the retracted position.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Current users of vehicles and other modes of transportation may employ one or more devices to assist in entering and exiting their vehicle. For example, users may need a physical handle or support that helps provide the users with leverage when they are sitting down into a vehicle or getting up and out of the vehicle. In some circumstances, the users may use one or more accessories that clip or slide into or rest on a door latch or striker or vehicle frame to provide a handle for the users, where the handle provides the desired leverage to the users. When not being used, these accessories may be stowed in the vehicle's cabin, in a user's belongings, and so forth. Furthermore, since these accessories are removable and work in conjunction with the door latch, striker, or other vehicle component, the accessories introduce complications.

Such complications may include potential to damage the vehicle (for example, the door latch, striker, or other vehicle component), movement during operation of the vehicle such that the accessories are not accessible to the user when needed, be lost by the user when not in the vehicle, and so forth.

Embodiments of the systems and methods disclosed herein can provide an assisting device that is integrated into the vehicle itself. By integrating the assisting device with the vehicle, the user need not be responsible for maintaining, accessing, and installing the assisting device when needed. Additionally, the assisting device can be integrated such that risk of damage to the vehicle or the assisting device is reduced, such as by automating deployment and retraction of the assisting device, enabling visual and/or audible warnings to the user, and so forth. Further details and examples of these embodiments are provided below.

Figure 1:
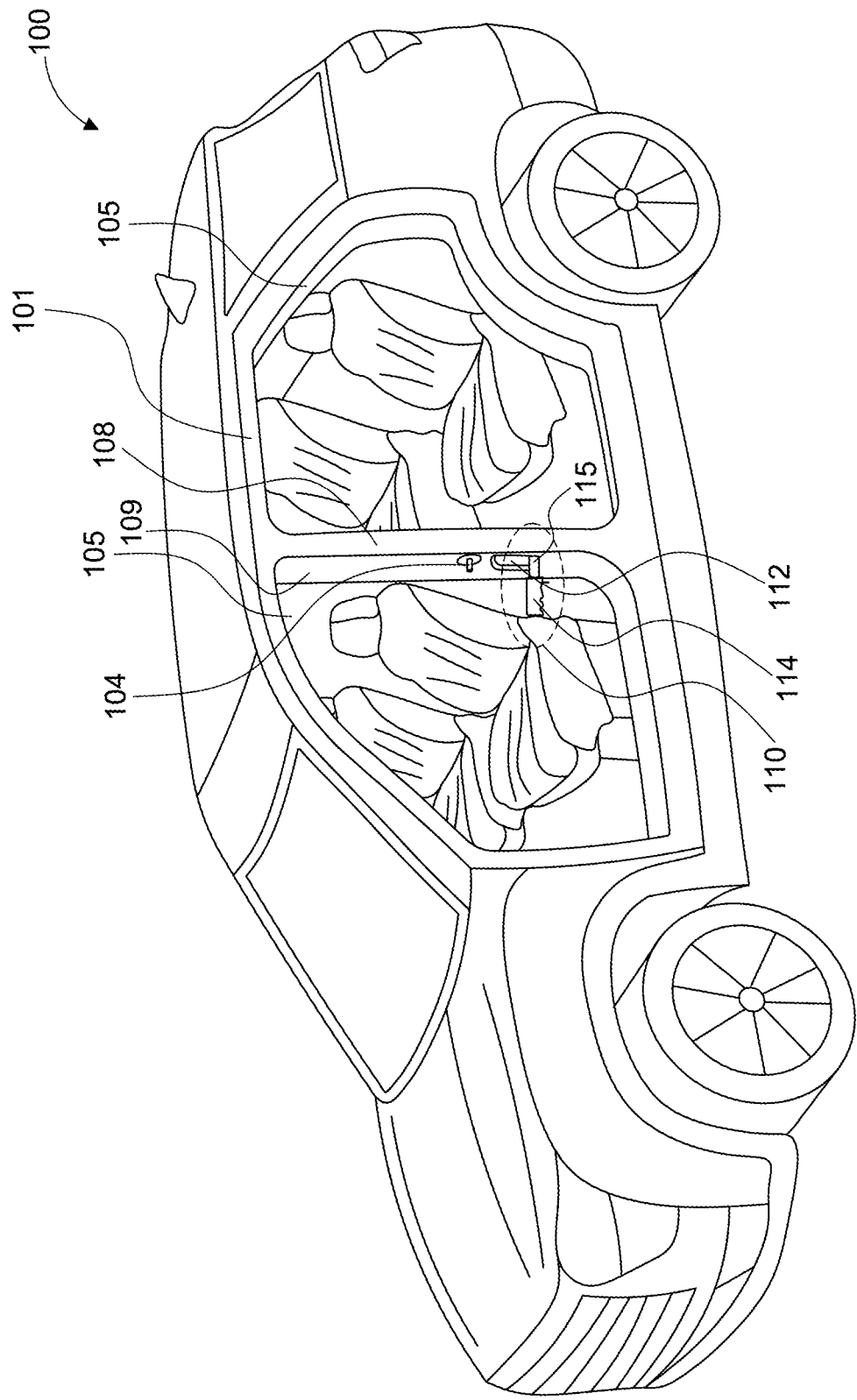
FIG. 1 is a perspective view of an example vehicle with which embodiments of the systems and methods disclosed herein may be implemented.

FIG. 1 is a perspective view of an example vehicle 100 with which embodiments of the systems and methods disclosed herein may be implemented. The systems and methods disclosed herein may be implemented with any of a number of different vehicles and vehicle types. For example, the systems and methods disclosed herein may be used with automobiles, trucks, buses, boats, all-terrain vehicles, golf carts, recreational vehicles, airplanes, and other on-or off-road vehicles which an operator or passenger may ingress and/or egress. Thus, the principals disclosed herein may also extend to other vehicle types that are not shown or recited explicitly. The systems and methods disclosed herein can be implemented in any type of vehicle regardless of its motive power source, including gasoline- or diesel-powered vehicles, fuel-cell vehicles, electric vehicles, hybrid electric vehicles, battery electric vehicles, or other vehicles.

The vehicle 100 that may include a body 101 that includes one or more doors via which an interior of the vehicle 100 is accessible to a passenger and/or operator (referred to herein interchangeably as "occupant"). Though not explicitly shown, the vehicle 100 includes a motive power source, such as an internal combustion engine, an electric motor, a combination thereof, and so forth. Driving force generated by the motive power source can be transmitted to one or more wheels via various components that transfer power from the motive power source to the one or more wheels to cause the vehicle 100 to move.

The vehicle 100 may include components as necessary to support operation of the motive power source, such as fuel or energy storage components, cooling components, control, drive, and operational components, occupant amenities, and the like.

The motive power source can provide motive power using fuel or energy stored within the vehicle 100.

In some embodiments, the control components for the vehicle 100 include an electronic control unit (ECU) that assists in controlling drive components of the vehicle 100 as well as other vehicle components, such as vehicle or occupant accessories. For example, the electronic control unit may control one or more of the occupant amenities, such as audio/visual equipment, occupant assistance devices, and so forth. The electronic control unit may include, for example, a microcomputer that includes a one or more processing units (e.g., microprocessors), memory storage (e.g., RAM, ROM, etc.), and I/O devices. The processing units of the electronic control unit may execute instructions stored in the memory storage to control one or more systems, subsystems, and/or components in the vehicle 100. The electrical control unit can include a plurality of electronic control units such as, for example, an electronic engine control module, an occupant accessories module, and so on. The various control units can be implemented using two or more separate electronic control units or using a single electronic control unit.

In some embodiments, the vehicle 100 can include a plurality of sensors (not explicitly shown in FIG. 1) that can be used to detect various conditions internal or external to the vehicle 100. For example, the vehicle 100 may include one or more door ajar sensors that indicate to the occupant when one or more of the vehicle doors is open or ajar, sensors that detect one or more conditions of an accessor or an accessory status, and so forth. The sensors can be integrated with the electronic control unit to monitor and/or control conditions or characteristics of the vehicle and/or its occupant accessories, and the like.

In some embodiments, one or more of the sensors include their own processing capability to compute results based on sensed information for additional information that can be provided to the electronic control unit. In other embodiments, one or more sensors may be data-gathering-only sensors that provide only raw data to the electronic control unit. In further embodiments, hybrid sensors may be included that provide a combination of raw data and processed data to the electronic control unit. The sensors may provide an analog output or a digital output.

In some embodiments, as introduced above, the vehicle 100 includes a number of doors having corresponding door openings 105. Each door, when in a closed position, may latch to an anchor 104 that is mounted to a front-facing surface 109 of a pillar 108 of the vehicle 100. The pillars 108 of the vehicle 100 may be vertical or substantially vertical supports of a window area of the vehicle 100. In some embodiments, the anchor 104 is disposed on other surfaces of the door opening 105 besides on the front-facing surface 109 of the pillar 108.

In certain embodiments, as introduced above, the occupant that travels in the vehicle 100 may utilize a removable grip device (not shown) that assists with the occupant entering or exiting the vehicle 100. In some embodiments, the grip device can be inserted into the latch 104 (not shown), clamp to or rest on the pillar 108, or otherwise attach to part of the pillar 108, the vehicle 100, or an interior of the vehicle 100. However, removable grip devices can create problems for occupants, such as increasing steps required by the occupant when entering or exiting the vehicle 100, storing the grip device after use (for example, when not in the vehicle or while traveling in the vehicle 100), accessing the grip device before use (for example, when entering the vehicle 100 before travel or exiting the vehicle 100 after travel), and so forth. Thus, the removable grip devices, while aiding the occupants, may also introduce various difficulties that make their use less than desirable.

The vehicle 100 of FIG. 1 introduces an integrated or built-in grip device 110 (also referred to herein interchangeably as "device 110") that provides the benefits of the removable grip devices introduced above without many of the difficulties and problems thereof. For example, because the device 110 is integrated with the vehicle 100, the occupant need not worry about manually storing the device 110 after use when the occupant is traveling in or outside of the vehicle 100.

In some embodiments, the device 110 is stored in a cavity 112 in the pillar 108. In some embodiments, the cavity 112 is reinforced to maintain structural integrity of the door frame and the pillar 108. Reinforcing the cavity 112 may also reduce a likelihood that either of the device 110 or the pillar 108 is damaged during use of the device 110 to assist with entering or exiting the vehicle 100. In some embodiments, the cavity 112 is placed inside the vehicle 100 relative to the door or on a different surface of the door frame where it is still easily accessible to the occupant when exiting or entering the vehicle 100. The device 110 may be configured to be in a retracted state within the cavity 112 when the door of the vehicle 100 is closed and be prevented from transitioning to a deployed state while the door is closed. In some embodiments, the device 110 is prevented from transitioning to the deployed state because the door physically prevents the device 110 from deploying. In some embodiments, one or more sensors or controls may sense one or more conditions and prevent the device 110 from deploying while the door is closed. In some embodiments, the device 110 is stowed in the cavity 112 when in the retracted state.

The device 110 may be connected to the cavity 112 via a hinge or similar component(s) that enables the device 110 to be stored in and deployed from the cavity 112. For example, the device 110 may comprise a hinge that enables the device 110 to pivot such that a handle or grip portion 114 of the device 110 is accessible for the occupant to grip or rest a hand on while entering or exiting the vehicle 100. As shown in the further detailed image in FIG. 2, for example, the device 110 may include a hinge or pin 116 via which the device 110 extends out from the cavity 112. For example, the device 110 may rotate about the hinge 116 to be in an extended state with respect to the cavity 112. In some embodiments, the device 110 comprises one or more springs or spring-like mechanisms that enable the device 110 to be extended and retracted as needed, instead of or in addition to the hinge 116. In some embodiments, the occupant may depress the device 110 when retracted into the cavity 112 or depress a button or similar release mechanism to cause the retracted device 110 to extend partially or completely. In some embodiments, the device 110 comprises one or more axes of articulation, such as the deployable axis of articulation about the hinge 116 used to deploy the device 110, a rotatable axis of articulation 117 used to enable the device 110 to articulate outward or inward as appropriate based on a need of the occupant, and so forth.

Figure 2:
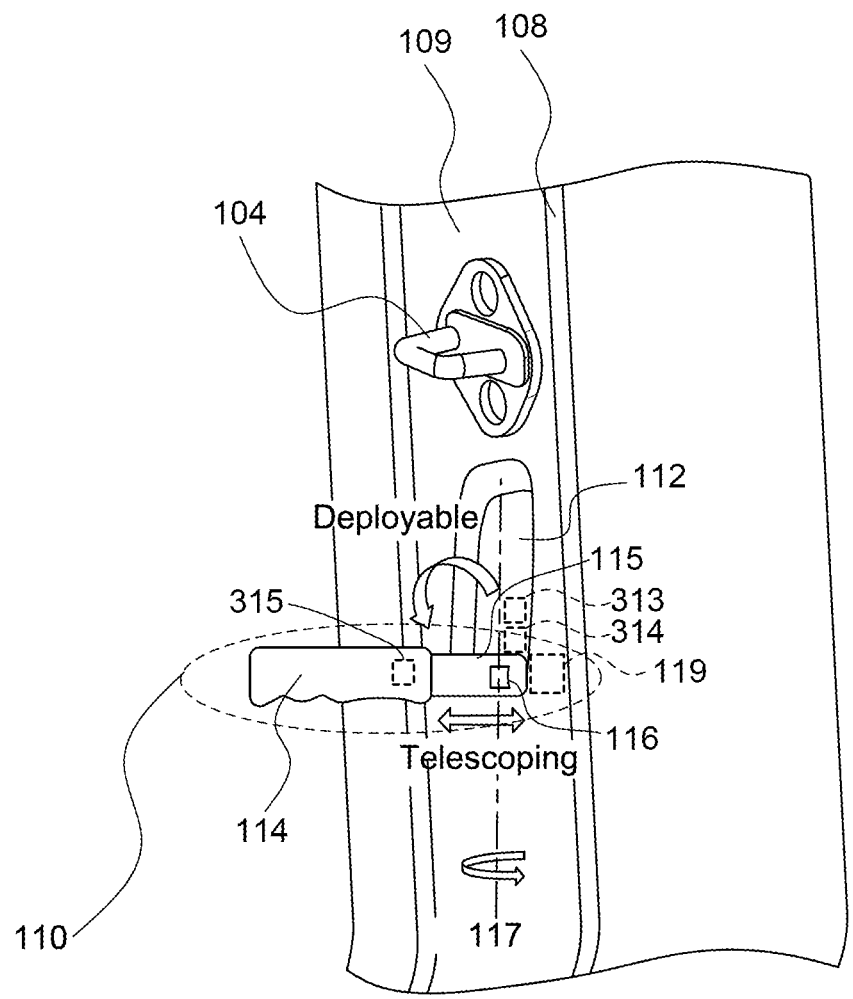
FIG. 2 illustrates a close-up view of aspects of the invention as integrated into the example vehicle of FIG. 1 and with which embodiments of the systems and methods disclosed herein may be implemented.

In some embodiments, the device 110 is mounted on an interior surface of the vehicle 100 such that the occupant can cause the device 110 to rotate into a usable position as needed. For example, while FIG. 2 shows the device 110 attached to the cavity 112 via, for example, the hinge 116 on the front-facing surface 109 of the pillar 108 forming the door frame, the cavity 112 may be disposed on a surface of the pillar 108 that is part of the interior of the vehicle 100. In some embodiments, the device 110, when deployed, may rest upon an edge of the cavity 112 or another component that provides support to the device 110 and prevents the device 110 from moving vertically when force from the occupant is applied thereon.

In some embodiments, the device 110 is telescoping such that the occupant can extend or retract the device 110 during use. This may allow the occupant to properly position the handle portion 114 so that it is most convenient and provides needed assistance to the occupant exiting or entering the vehicle 100. In some embodiments, the device 110 is spring loaded, such that the occupant may grab the device 110 and pull the device 110 downward into a deployed position. In such embodiments, the device 110 may rotate about the hinge 116 and move in opposition to a force from a spring. Where the occupant's pulling on the device 110 causes the device 110 to be deployed, the release of the device 110 by the occupant may enable the spring to cause the device 110 to return to its retracted position in the cavity 112.

In some embodiments, the device 110 comprises one or more electronic components that enable the device 110 to be automatically extended and retracted when the occupant's door is open. For example, the device 110 may comprise a motor 119 (shown schematically in FIG. 2) that controls rotation of the device 110 about the hinge 116 or similar components to cause the device 110 to be deployed from the cavity 112. In some embodiments, when the device 110 is retractable into the cavity 112, the device 110 comprises one or more motors 119 that enable the device 110 to be electronically extended from and retracted into the cavity 112. Furthermore, when the device 110 includes multiple axes of articulation, each axis may be deployed using or comprise a different motor or similar component or a single motor with appropriate mechanical components to facilitate such articulation. Furthermore, the device 110 may comprise a combination of electronically controlled and manual components and configurations, such as where the device 110 is deployed electronically but manually extended or retracted, rotated into a preferred orientation, and so forth.

In some embodiments, the device 110 and/or the cavity 112 comprises one or more sensors 315 (corresponding to the device 110 and shown schematically in FIG. 2 and described more fully below with respect to FIG. 3 and that detects when the device 110 is deployed from or retracted into the cavity 112), 314, 313 (both corresponding to the cavity 112 and shown schematically in FIG. 2 and described more fully below with respect to FIG. 3 and that detect, respectively, when the device 110 is deployed from or retracted into the cavity 112). The vehicle 100, for example via the electronic control unit, may monitor the one or more sensors 315, 314, 313 to determine whether the device 110 is deployed or retracted into the cavity 112. The electronic control unit may use such sensors to provide a warning to the occupant that the device 110 is deployed after entering or exiting the vehicle 100 to prevent the occupant from closing the vehicle door while the device 110 is deployed. Such a warning may prevent the occupant from accidentally closing the door while the device 110 is deployed, which could damage one or more of the device 110, the cavity 112, the pillar 108, or another component of the vehicle 100. In some embodiments, the warning is an audio and/or visual warning to the occupant.

Additionally, the vehicle 100 may monitor the one or more sensors of the device 110 and/or the cavity 112 to determine when the device 110 is extended and ready for use by the occupant when the occupant is preparing to enter or exit the vehicle 100. For example, the vehicle 100 may use the one or more sensors to determine when the device 110 is fully deployed to prevent the occupant from placing weight or force on the device 110 when only partially deployed, in which case the device 110 may move or otherwise not provide opposing resistance to the occupant's weight or force. The vehicle 100 may provide the occupant with an audio and/or visual alert to indicate when the device 110 is fully deployed and ready for use.

In some embodiments, the one or more sensors of the device 110 enable the device 100 to track how the device 110 is oriented (for example, the specific orientation rotation, extension, etc., of the device) by the occupant. This enables the vehicle 100 to automatically deploy the device 110, as described in more detail below. In some embodiments, the one or more sensors of the device 110 may operate in conjunction with, for example, a door ajar sensor, to prevent the device 110 from being deployed while the door is closed.

For example, the ECU may use information from the door ajar sensor to prevent the device 110 from being deployed using one or more electronic components (for example, when the device 110 can be configured to be automatically deployed).

In some embodiments, the vehicle 100 may use a combination of the sensors and the electronic components of the device 110 to automatically deploy the device 110 when the occupant who has used the device 110 previously is entering or exiting the vehicle 100. For example, when the occupant enters the vehicle 100, the vehicle 100 may detect use of the device 110 by the occupant (for example, via the one or more sensors of the device 110 and/or the cavity 112). When the occupant opens the door to exit the vehicle 100, the vehicle 100 may automatically deploy the device 110. Furthermore, the vehicle 100 may deploy the device 110 in a particular orientation based on a previous orientation for that occupant. Furthermore, where the vehicle 100 comprises a visual sensor, the vehicle 100 may associate usage and/or orientation of the device 110 with a particular occupant so that personalized settings can be loaded when the vehicle 100 detects that the particular occupant is using the vehicle 100.

In some embodiments, the device 110 may comprise one or more components that enable the device 110 to be automatically retracted into the cavity 112 when the corresponding door closes. For example, the device 110 is spring loaded to cause the device 110 to automatically retract back into the cavity 112 when the occupant releases the handle portion 114 of the device 110. In some embodiments, the device 110 and the cavity 112 may be formed such that when the door strikes the device 110 in an extended state, the device 110 automatically retracts or is pushed back into the cavity 112. For example, the door comprises a protrusion or similar component that pushes the deployed device 110 into the cavity 112 as the door is closing. This may prevent the damage to the device 110 and/or the vehicle 100 should the occupant or other use of the vehicle 100 close the door without manually retracting the device 110.

FIG. 2 illustrates a close-up view of aspects of the invention as integrated into the example vehicle 100 of FIG. 1 and with which embodiments of the systems and methods disclosed herein may be implemented. More specifically, FIG. 2 focuses on the integration of the device 110 into the cavity 112 of the pillar 108 below the latch 104, with reference to FIG. 1.

FIG. 2 shows how the device 110 comprises a telescoping portion 115 and the handle portion 114, where the telescoping portion 115 enables the occupant to position the handle portion 114 as needed to assist the occupant's entry into and exit from the vehicle 100. Furthermore, FIG. 2 depicts how the device 110 may be rotatable about a vertical axis of articulation 117 of the pillar 108 and/or an axis into the interior of the vehicle along the hinge 116, which causes deployment of the device 110.

The examples of FIGS. 1 and 2 are provided for illustration purposes only as an example of a vehicle system with which embodiments of the disclosed technology may be implemented. One of ordinary skill in the art reading this description will understand how the disclosed embodiments can be implemented with various other vehicle platforms.

Figure 3:
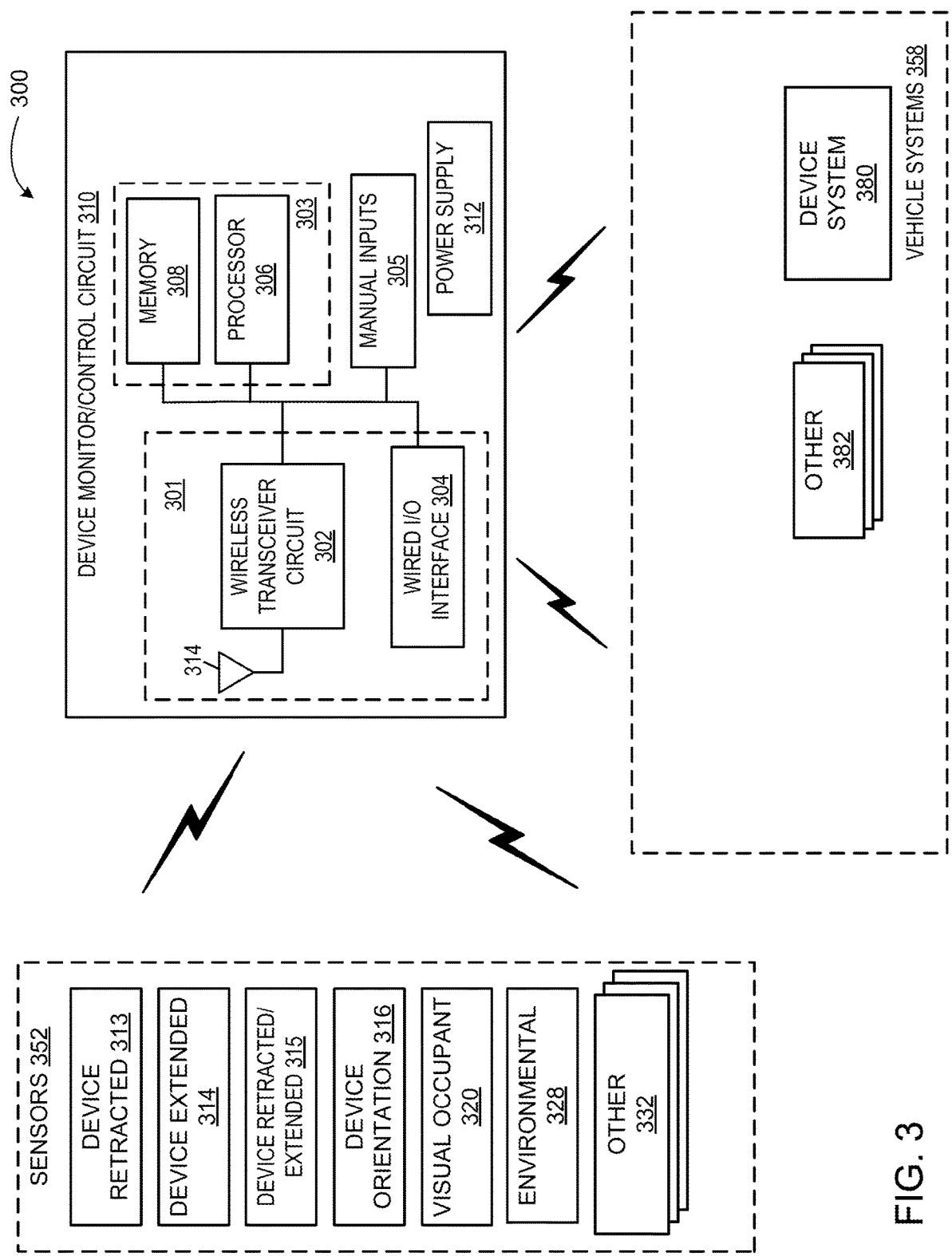
FIG. 3 illustrates an example architecture for monitoring use of a deployable grip in accordance with one embodiment of the systems and methods described herein.

FIG. 3 illustrates an example architecture for monitoring use of a deployable grip in accordance with one embodiment of the systems and methods described herein.

Referring now to FIG. 3, in this example, a device control system 300 includes a device monitor/control circuit 310, a plurality of sensors 352, and a plurality of vehicle systems 358. The sensors 352 and vehicle systems 358 can communicate with the device monitor/control circuit 310 via a wired or wireless communication interface or bus. Although the sensors 352 and vehicle systems 358 are depicted as communicating directly with the device monitor/control circuit 310, they can also communicate with each other as well as with other vehicle systems. The device monitor/control circuit 310 can be implemented as an ECU or as part of an ECU, such as the electronic control unit introduced above. In other embodiments, the device monitor/control circuit 310 can be implemented independently of the ECU.

The device monitor/control circuit 310 in this example includes a communication circuit 301, a decision circuit 303 (including a processor 306 and memory 308 in this example) and a power supply 312. Components of the device monitor/control circuit 310 are illustrated as communicating with each other via a data bus, although other communication interfaces can be included. The device monitor/control circuit 310 in this example also includes one or more manual inputs 305 that can be operated by the occupant to manually control the device 110, if applicable.

The processor 306 can include a GPU, CPU, microprocessor, or any other suitable processing system. The memory 308 may include one or more various forms of memory or data storage (e.g., flash, RAM, etc.) that may be used to store calibration parameters, images (analysis or historic), point parameters, instructions, and variables for the processor 306 as well as any other suitable information. The memory 308 can be made up of one or more modules of one or more different types of memory and may be configured to store data and other information as well as operational instructions that may be used by the processor 306 to the device monitor/control circuit 310.

Although the example of FIG. 3 is illustrated using the processor 306 and the memory 308, as described below with reference to circuits disclosed herein, the decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the device monitor/control circuit 310.

The communication circuit 301 may comprise either or both a wireless transceiver circuit 302 with an associated antenna 314 and a wired I/O interface 304 with an associated hardwired data port (not illustrated). As this example illustrates, communications with the device monitor/control circuit 310 can include either or both wired and wireless communications circuits 301. The wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. The antenna 314 is coupled to the wireless transceiver circuit 302 and is used by the wireless transceiver circuit 302 to transmit radio signals wirelessly to wireless equipment with which it is connected and to receive radio (RF) signals as well. These RF signals can include information of almost any sort that is sent or received by the device monitor/control circuit 310 to/from other entities such as the sensors 352 and vehicle systems 358.

The wired I/O interface 304 can include a transmitter and a receiver (not shown) for hardwired communications with other devices. For example, the wired I/O interface 304 can provide a hardwired interface to other components, including the sensors 352 and vehicle systems 358. The wired I/O interface 304 can communicate with other devices using Ethernet or any of a number of other wired communication protocols whether standardized, proprietary, open, point-to-point, networked or otherwise.

The power supply 312 can include one or more of a battery or batteries (such as, e.g., Li-ion, Li-Polymer, NiMH, NiCad, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

The sensors 352 can include, for example, the sensors described above with reference to the example of FIG. 1. In the illustrated example, the sensors 352 include one or more of a device retracted sensor 313, a device extended sensor 314, a device retracted/extended sensor 315, a device orientation sensor 316, a visual occupant sensor 320, and an environmental sensor 328 (e.g., to detect one or more environmental conditions). Additional sensors 332 can also be included as may be appropriate for a given implementation of the device control system 300.

The vehicle systems 358 can include any of a number of different vehicle components or subsystems used to control or monitor various aspects of the vehicle and its performance. In this example, the vehicle systems 358 include a device system 380, and other vehicle systems 382. The device system 380 may comprise one or more motors or similar components that enable automatic control of the deployment and retraction of the device 110 based on one or more inputs, such as a door ajar sensor, the environmental sensors 328, and so forth.

During operation, the device monitor/control circuit 310 can receive information from various vehicle sensors 352 to determine whether the device 110 should be deployed, is deployed and should be retracted, and so forth. Also, the occupant may manually deploy or retract the device 110 by, for example, operating the manual inputs 305. In some embodiments, the manual inputs 305 are provided via one or more of touch panel controls, joystick controls, pushbutton controls, toggle switch controls, and the like. The communication circuit 301 can be used to transmit and receive information between the device monitor/control circuit 310 and the sensors 352 and the device monitor/control circuit 310 and the vehicle systems 358.

In various embodiments, the communication circuit 301 can be configured to receive data and other information from the sensors 352 that is used in determining whether to deploy and/or retract the device 110 and/or whether to provide the occupant with an alert that the device 110 is deployed and should be retracted. Additionally, the communication circuit 301 can be used to send an alert or interlock to the device system 380 as part of monitoring and operating the device 110. For example, the communication circuit 301 can be used to communicate signals from the sensors 352 to, for example, the device system 380. The device system 380 may use the sensor data from the sensors 352 to determine whether and/or when to deploy and/or retract the device 110. For example, the device system 380 receives data indicating that the door is open and that there is an obstacle in a position that may make occupant ingress or egress relative to the vehicle 100 difficult. Accordingly, the device system 380 may deploy the device 110 to an appropriate position and/or orientation to facilitate the occupant's ingress or egress. As such, the device system 380 may use the various sensors 352 to control the device 110. In some embodiments, the device retracted sensor 313 indicates when the device 110 is retracted, the device extended sensor 314 indicates when the device 110 is extended, the device retracted/extended sensor 315 indicates when the device 110 is retracted or extended, the device orientation sensor 316 indicates an orientation of the device 110, for example, relative to the cavity 112, the visual occupant sensor 320 identifies when a known occupant is approaching the vehicle 100, and the environmental sensors 328 may detect environmental conditions, such as obstacles near one or more doors of the vehicle 100, curbs, steps, and the like, relative to the vehicle 100.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto, such as the decision circuit 303.

In this document, the terms "computer program medium" and "computer usable medium" are used to generally refer to transitory or non-transitory media. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the decision circuit 303 to perform features or functions of the present application as discussed herein.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A deployable grip comprising:
a telescoping arm mounted to and extendable from a pillar of a vehicle; and
a handle attached to the telescoping arm;
wherein the telescoping arm, with the handle attached thereto, is rotatable between a deployed position and a retracted position relative to the pillar of the vehicle upon application of a force on the handle, and is disposed inside of a reinforced cavity disposed in the pillar of the vehicle when the telescoping arm is in the retracted position,
wherein the handle:
provides a physical aid, when deployed, to an occupant of the vehicle while the occupant is entering or exiting the vehicle, and
is deployable and extendable when a door of the vehicle proximal to the pillar of the vehicle is open,
wherein the deployable grip or the reinforced cavity comprises a sensor configured to generate a signal indicating whether the telescoping arm is in the deployed position or the retracted position.

2. The deployable grip of claim 1, wherein the handle is further configured to telescopingly extend and retract, via the telescoping arm, relative to the deployed position and wherein a telescopingly extended position of the handle provides the occupant with improved access to the handle.

3. The deployable grip of claim 1, wherein a controller is configured to generate an alert to the occupant based on the signal from the sensor that the telescoping arm is in the deployed position after the occupant uses the handle to enter or exit the vehicle.

4. The deployable grip of claim 1, wherein the deployable grip comprises a motor configured to cause the telescoping arm to deploy into the deployed position or retract into the retracted position and wherein a controller is configured to automatically cause the motor to deploy the telescoping arm when the door is opened and retract the telescoping arm after use by the occupant.

5. The deployable grip of claim 1, wherein the deployable grip rotates around a vertical axis relative to the vehicle.

6. A stowable assistive device comprising:
a reinforced cavity embedded within a door frame of a vehicle in proximity to an occupant point of entry and exit of the vehicle;
a telescoping arm; and
a handle attached to the telescoping arm and configured to move between a deployed position and a retracted position relative to the door frame of the vehicle upon application of a force on the handle, wherein the telescoping arm is disposed within the reinforced cavity when the handle is in the retracted position,
wherein the handle:
provides a physical aid, when deployed, to the occupant of the vehicle while the occupant is entering or exiting the vehicle, and
stows in the reinforced cavity when not in the deployed position and when in the retracted position; and
wherein the stowable assistive device further comprises a sensor configured to generate a signal indicating whether the handle is in the deployed position or the retracted position.

7. The stowable assistive device of claim 6, wherein the handle rotates around a vertical axis relative to the vehicle.

8. The stowable assistive device of claim 6, wherein the door frame of the vehicle comprises a pillar of the vehicle.

9. The stowable assistive device of claim 8, wherein the telescoping arm, with the handle attached thereto, is disposed inside of the reinforced cavity disposed in the pillar of the vehicle when the handle is in the retracted position.

10. The stowable assistive device of claim 6, wherein the handle is further configured to telescopingly extend and retract, via the telescoping arm, relative to the deployed position and wherein a telescopingly extended position of the handle provides the occupant with improved access to the handle.

11. The stowable assistive device of claim 6, wherein a controller is configured to generate an alert to the occupant based on the signal from the sensor that the handle is in the deployed position after the occupant uses the handle to enter or exit the vehicle.

12. The stowable assistive device of claim 6, wherein the handle or the telescoping arm comprises a motor configured to cause the handle to deploy into the deployed position or retract into the retracted position and wherein a controller is configured to automatically cause the motor to deploy the handle when the door of the vehicle proximal to the door frame of the vehicle is opened and retract the handle after use by the occupant.

* * * * *